April 15, 1952 M. M. HURST 2,592,902
DRIER
Filed Oct. 7, 1947 8 Sheets-Sheet 1
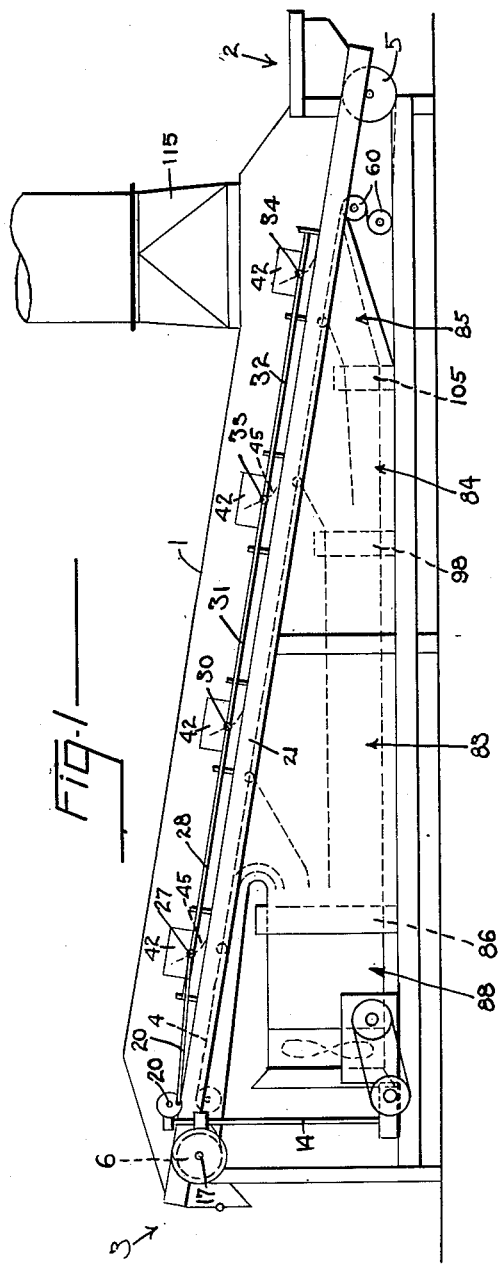
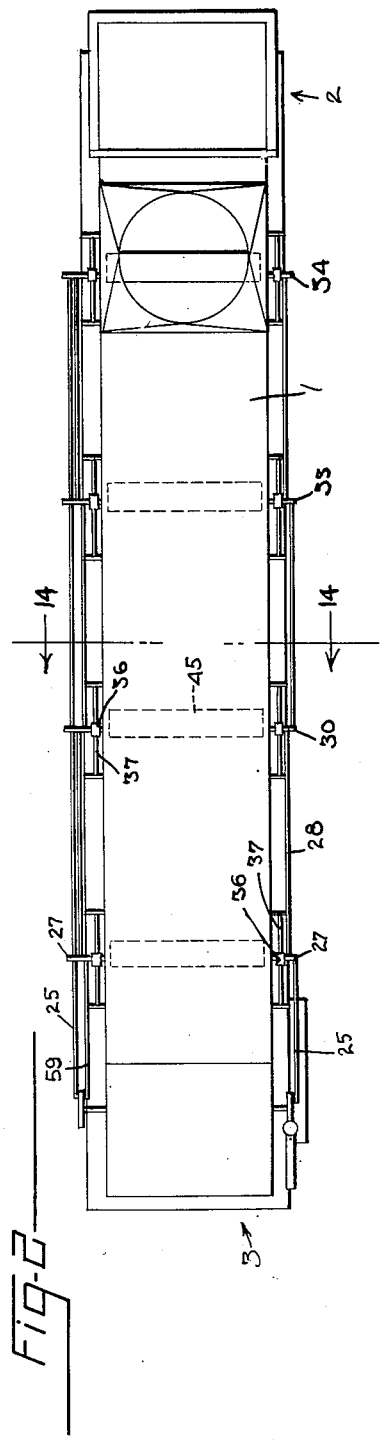
INVENTOR.
MOWATT M. HURST
BY
Boykin, Mohler & Beckley
ATTORNEYS April 15, 1952 M. M. HURST 2,592,902
DRIER
Filed Oct. 7, 1947 8 Sheets-Sheet 2
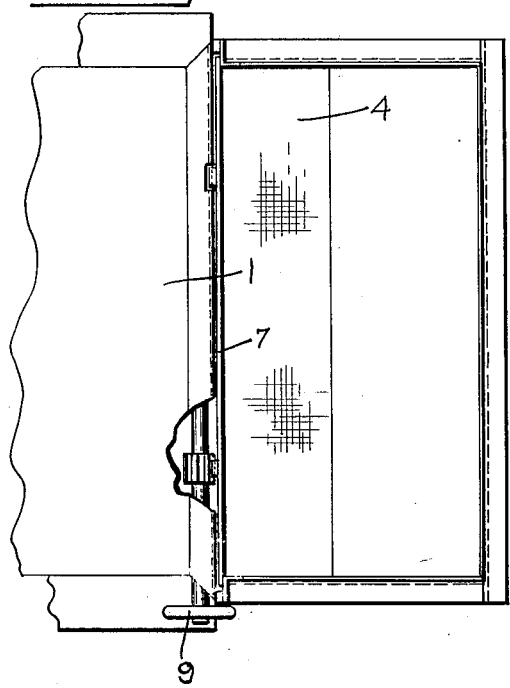
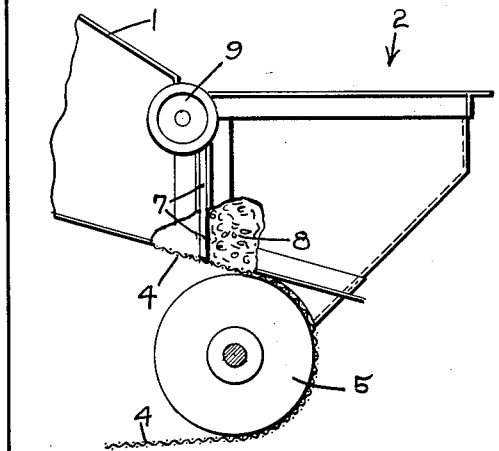
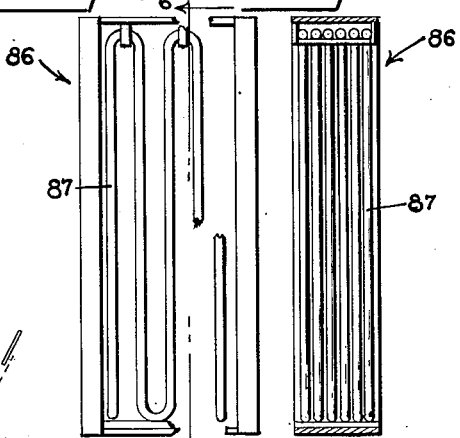
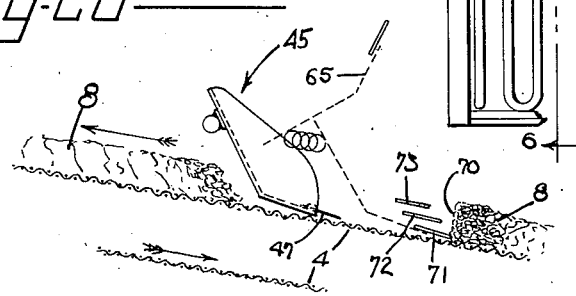
INVENTOR.
MOWATT M. HURST
BY
Boyken, Mohler & Beckley
ATTORNEYS

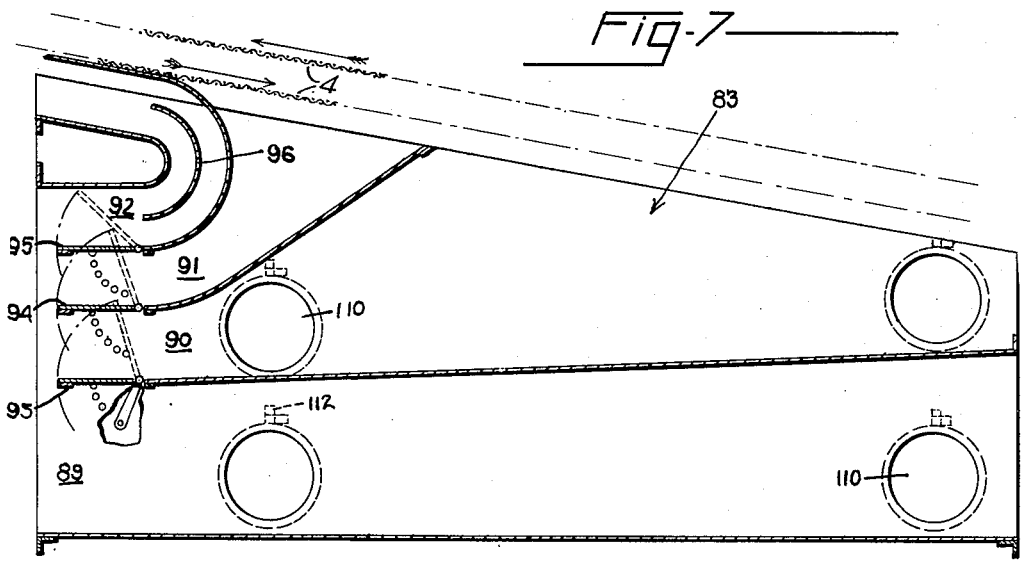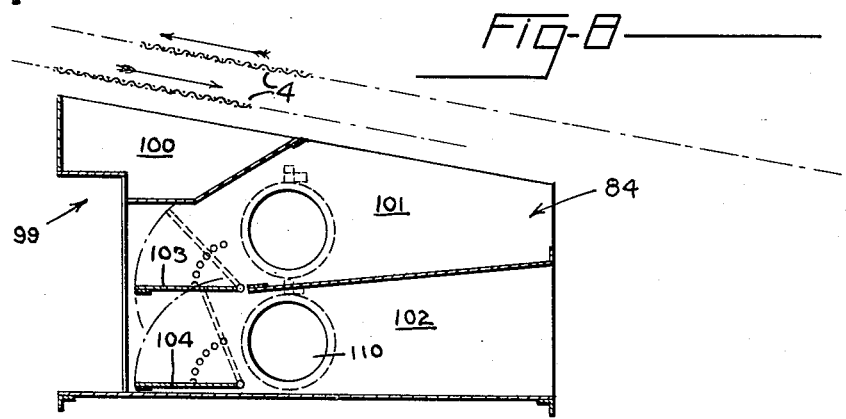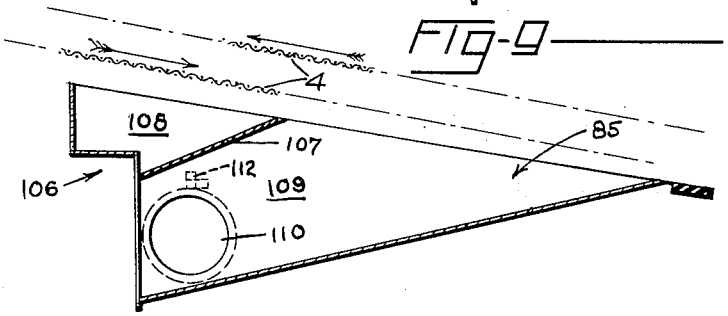

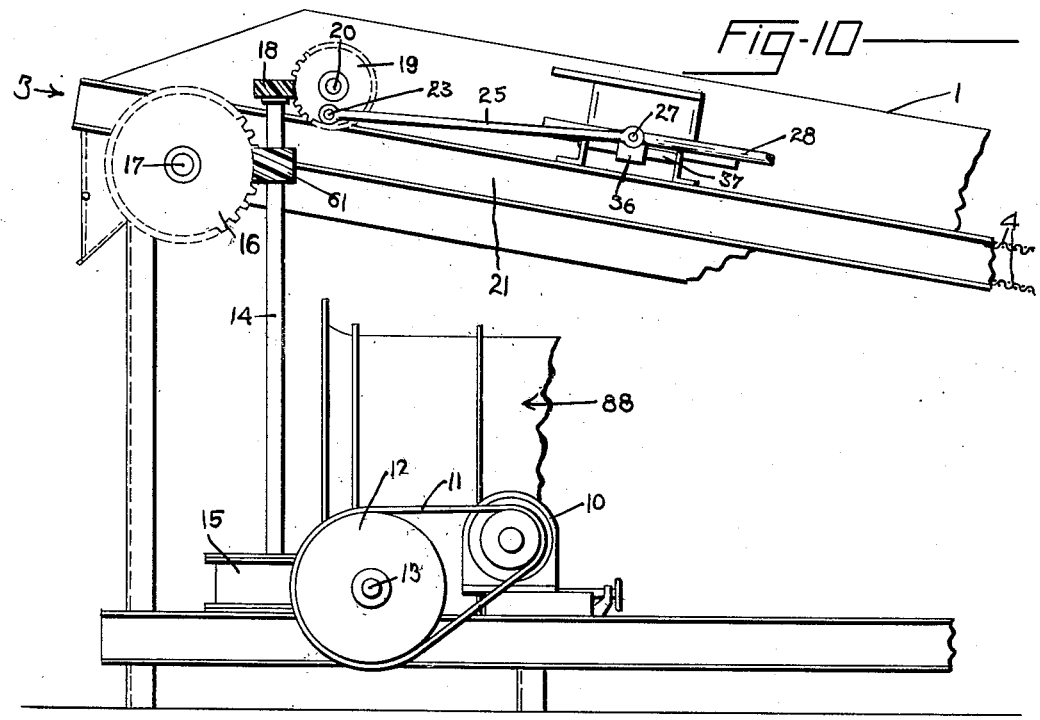
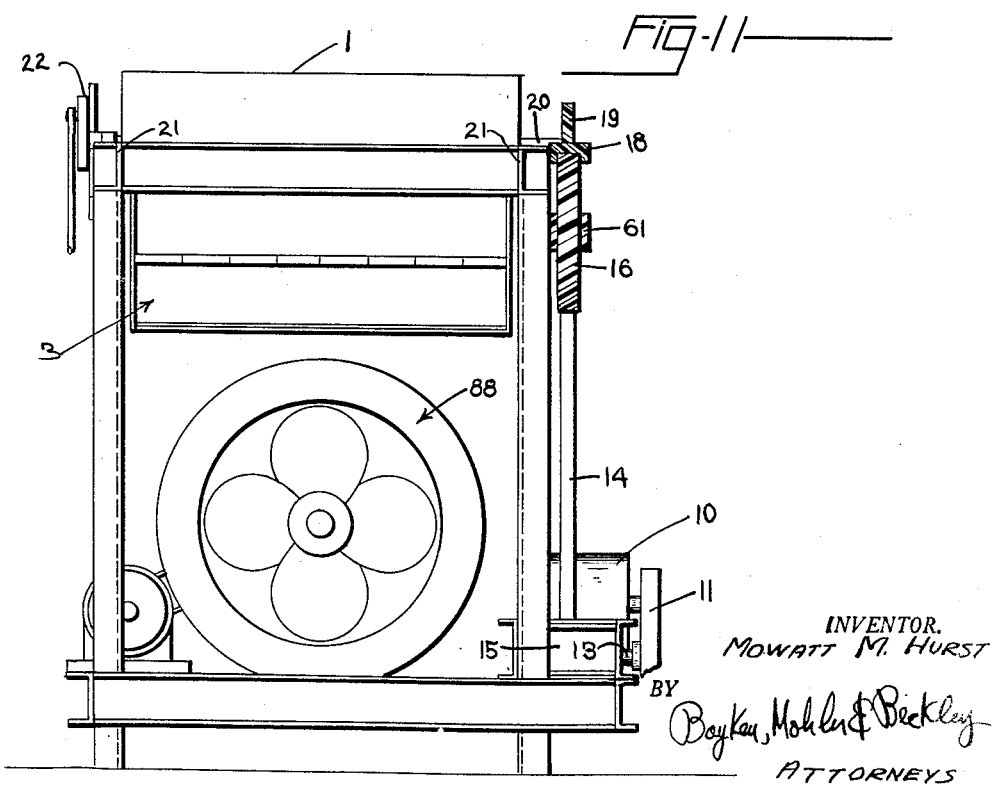

April 15, 1952     M. M. HURST     2,592,902
DRIER
Filed Oct. 7, 1947     8 Sheets-Sheet 5
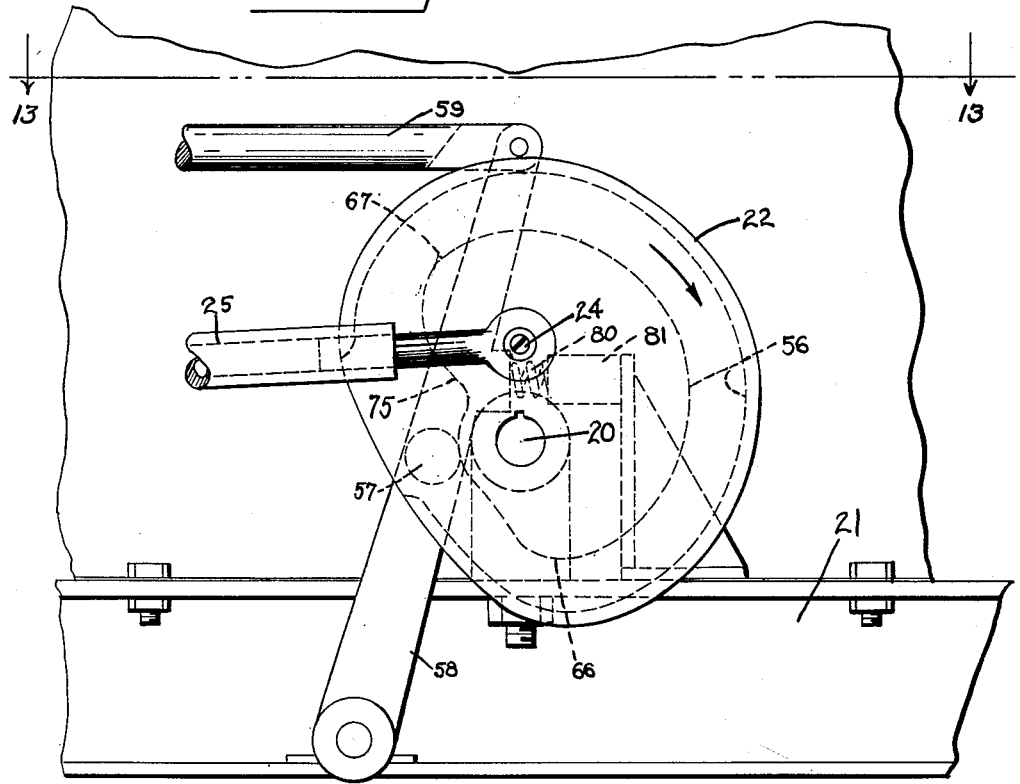
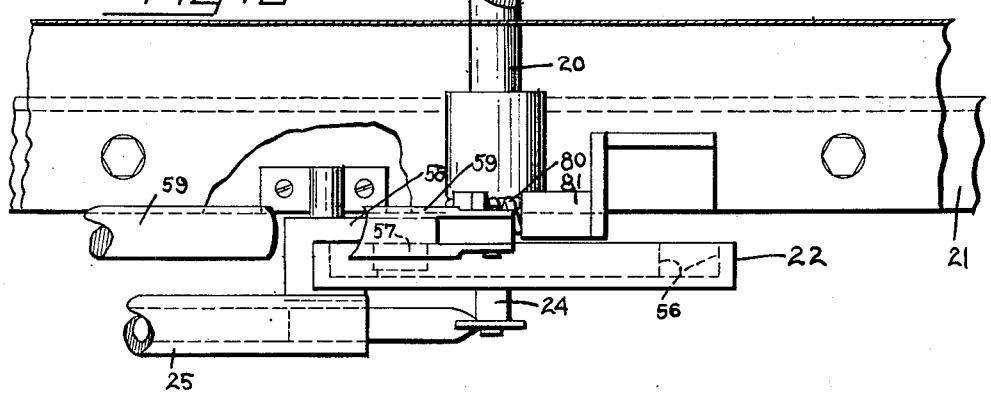
INVENTOR.
MOWATT M. HURST April 15, 1952 M. M. HURST 2,592,902
DRIER
Filed Oct. 7, 1947 8 Sheets-Sheet 6
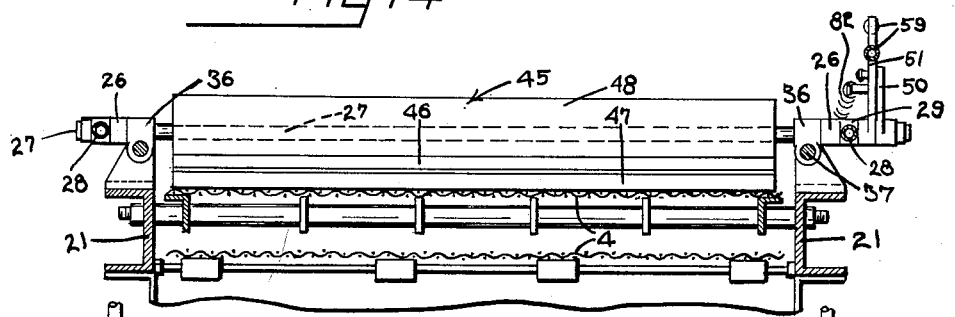
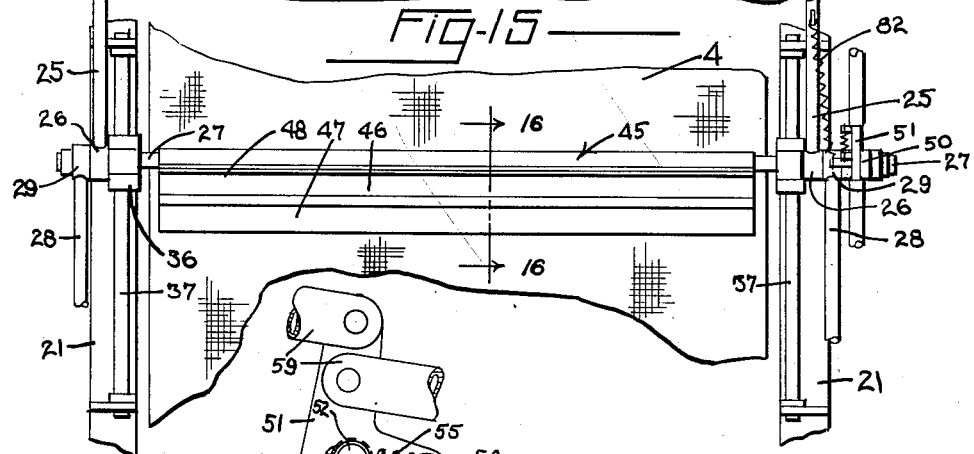
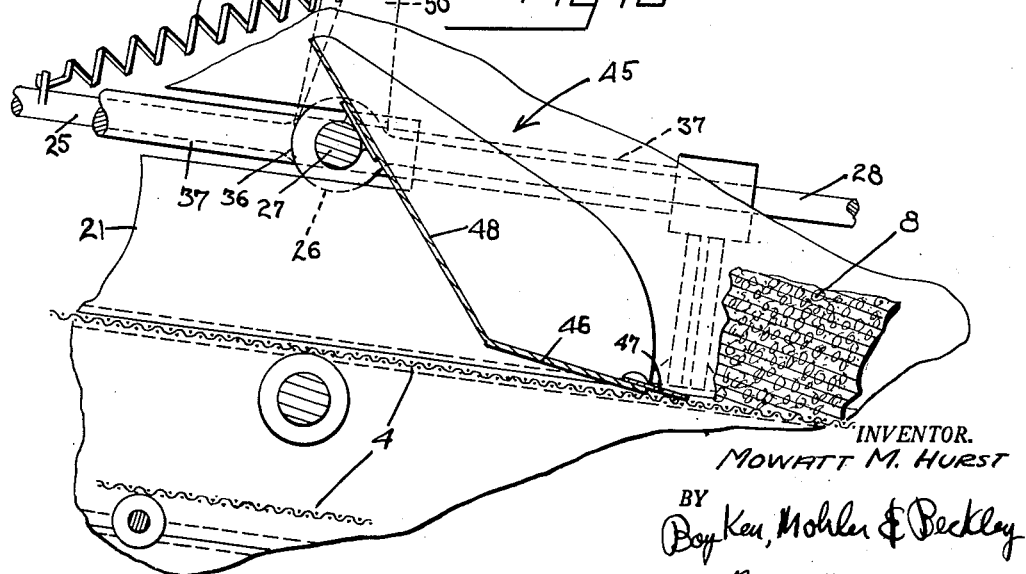
INVENTOR.
MOWATT M. HURST
BY Boy Ken, Mohler & Beckley
ATTORNEYS April 15, 1952 M. M. HURST 2,592,902
DRIER
Filed Oct. 7, 1947 8 Sheets-Sheet 7
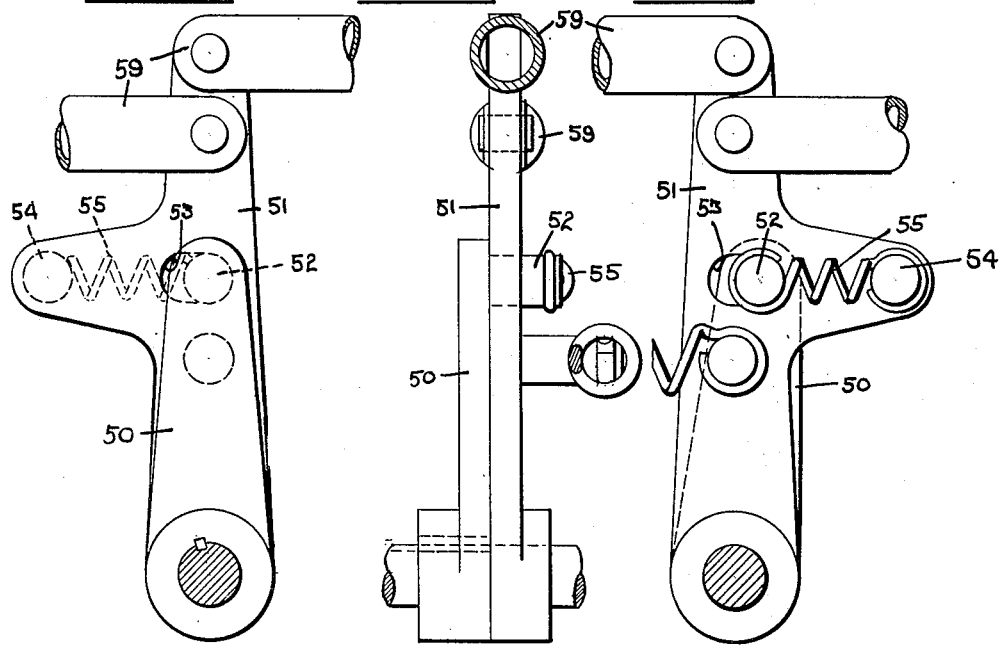
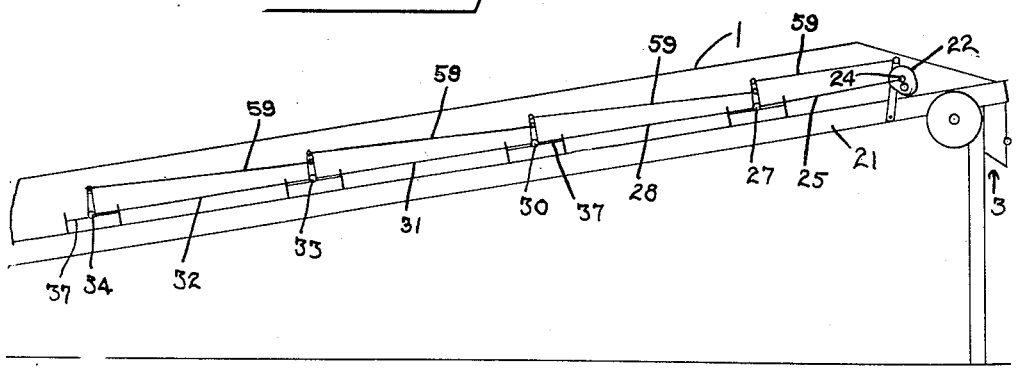
INVENTOR.
MOWATT M. HURST
BY
Boyken, Mohler & Beckley
ATTORNEYS April 15, 1952 M. M. HURST 2,592,902
DRIER
Filed Oct. 7, 1947 8 Sheets-Sheet 8
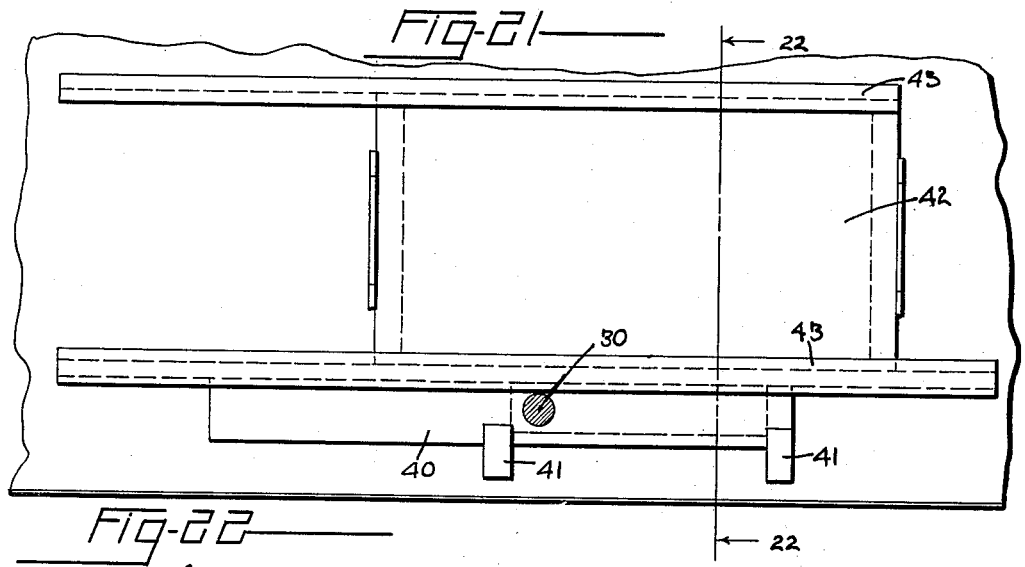
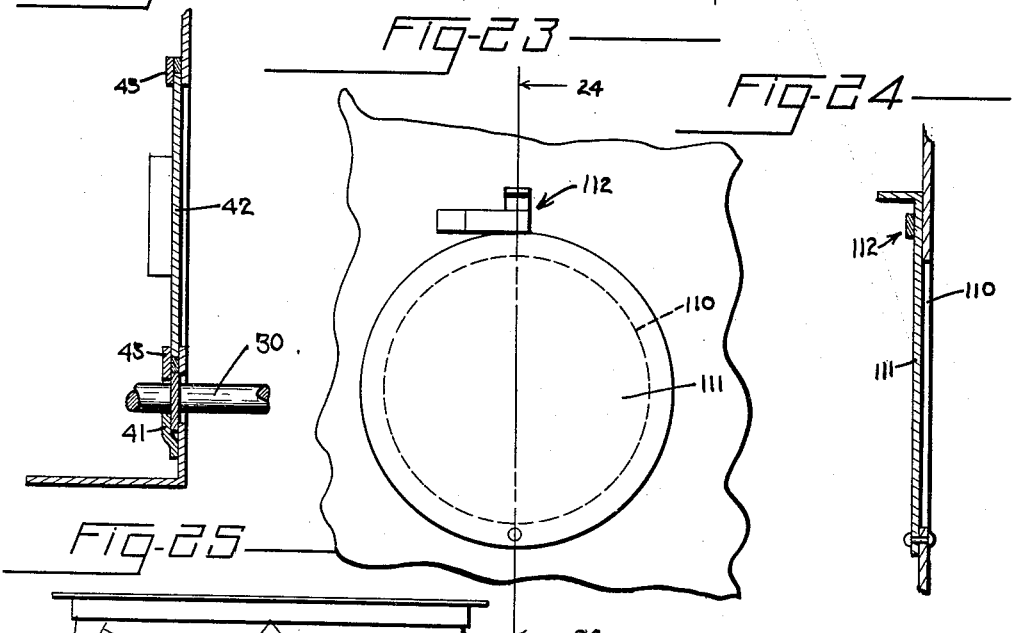
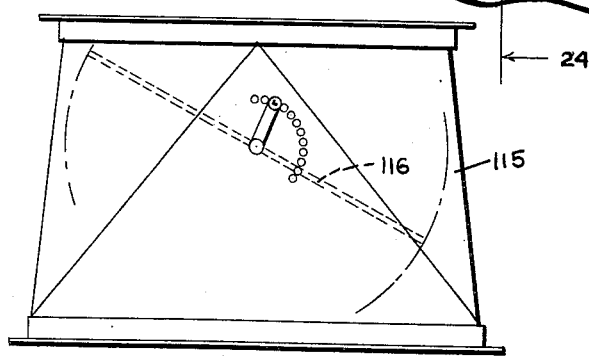
INVENTOR.
MOWATT M. HURST
BY
Boyken, Mohler & Beckley
ATTORNEYS Patented Apr. 15, 1952

2,592,902

UNITED STATES PATENT OFFICE 2,592,902

DRIER

Mowatt M. Hurst, San Francisco, Calif.

Application October 7, 1947, Serial No. 778,295

5 Claims. (Cl. 34—236)

This invention relates to a method of drying material and to a drier adapted to carry out said method, and has for one of its objects the provision of a drier that is adapted to dry material more efficiently and uniformly than heretofore.

Another object of the invention is the provision of a drier that is adapted to uniformly dry a relatively large volume of material per minute without burning or scorching said material and which drier is adapted to prevent the material from sticking together thereby uniformly drying each particle.

A still further object of the invention is the provision of a drier in which the material is moved along a path of travel, and which drier has means for completely rearranging the material that is being dried at spaced points along the path of travel of the material thereby promoting a more uniform drying of the material and preventing the material from piling up and from caking or sticking together in undesirable lumps.

An additional object of the invention is the provision of means for moving the material along a path of travel and subjecting said material to the influence of drying heat of different temperatures during said movement with the temperature greatest when the material contains the most moisture, and then progressively less as the moisture is eliminated.

In conventional tunnel type driers, the material is carried on trays through a tunnel and hot air is moved through said tunnel to dry the material and to carry off the moisture. Obviously, if the temperature is too high the material will be scorched or burned, and in spite of precautions that are taken the material is unevenly dried inasmuch as its position is unchanged during movement through the tunnel, and some pieces secure more heat than others due to their unfavorable positions at the start. Also the materal sticks to the trays and must be scraped therefrom, and the particles or bodies of fruit, vegetables, etc. being dried will stick together.

In the trommel or cylinder type driers the heat applied in each cylinder is relatively constant, except for such change as occurs due to natural heat transfer, hence the heat applied to the product when it contains the maximum moisture is usually far less than it will stand without injury, but this temperature must be maintained so no injury will result to the material that is in a more advanced drying stage. Also in cylinder driers using flights, the constant abrasive action of the bodies of certain products rolling over each other is objectionable, and furthermore the movement of the material through the driers is relatively slow and the bodies tend to stick on the flights and to the cylinder walls. Once a sticking occurs the other particles tend to build up creating a cake or ball.

With the present invention all of the foregoing objections are eliminated and a clean, uniform, sanitary drying job on widely different kinds of material, such as apples, pumpkin seeds, and milk curd for casein glue, is accomplished. The method practiced in overcoming these objections as well as the apparatus, is the main object of this invention, but other advantages and objects will appear in the description and in the drawings.

In the drawings, Fig. 1 is a semi-diagrammatic side elevational view of the drier hereafter described.

Fig. 2 is a semi-diagrammatic top plan view of the drier which is shown in Fig. 1.

Fig. 3 is an enlarged top plan view of the feed hopper at the receiving end of the drier.

Fig. 4 is a part sectional and part side elevational view of the hopper shown in Fig. 3.

Fig. 5 is a fragmentary elevational view of one of the heating units, in this instance shown as steam pipes.

Fig. 6 is a sectional view of the heating unit of Fig. 5 taken along line 6—6 of Fig. 5.

Fig. 7 is a fragmentary vertical sectional view taken through the hot air flues adjacent the discharged end of the conveyor, the conveyor over said flues being indicated in section and in dot-dash lines.

Fig. 8 is a vertical sectional view taken through the central section of the hot air flues that are below the conveyor, the portion for receiving the heating unit being indicated but the heating unit being omitted.

Fig. 9 is a vertical sectional view taken through the end section of the hot air flues that is at the opposite end of the drier from that shown in Fig. 7.

Fig. 10 is an enlarged side elevational view of the discharge end of the conveyor.

Fig. 11 is an end elevational view of the discharge end of the conveyor.

Fig. 12 is an enlarged fragmentary side elevational view at the discharge end of the conveyor seen from the side opposite that shown in Fig. 10 and showing the cam for controlling certain movements of the devices in the drier for repositioning the material being dried.

Fig. 13 is a sectional view taken along line 13—13 of Fig. 12.

Fig. 14 is a sectional view taken along line 14—14 of Fig. 2 but with the enclosing housing omitted.

Fig. 15 is a top plan view of the portion shown in Fig. 14.

Fig. 16 is an enlarged sectional view taken along line 16—16 of Fig. 15.

Fig. 17 is an enlarged side elevational view of the lever means shown in Fig. 16 taken from the opposite side of the means as shown in Fig. 16, the shaft being shown in section.

Fig. 18 is an edge view of the lever means shown in Fig. 17.

Fig. 19 is a view of the lever means shown in Fig. 17 as seen from the opposite side.

Fig. 20 is a diagrammatic view of a portion of the side of the drier as seen from the side opposite that shown in Fig. 1 and indicating the positions of the lever means of Figs. 17 to 19 relative to the drier.

Fig. 21 is a fragmentary side elevational view of a portion of the drier housing through which a rod (shown in section) extends, and which rod oscillates transversely of its length through a covered slot indicated in Fig. 21.

Fig. 22 is a sectional view taken along line 22—22 of Fig. 21.

Fig. 23 is a fragmentary side elevational view of a closed cleanout or inspection opening in the side of the drier housing.

Fig. 24 is a sectional view taken along line 24—24 of Fig. 23.

Fig. 25 is an enlarged side elevational view of a part of the exhaust stack shown in Fig. 1 as seen from the side opposite that shown in Fig. 1.

Fig. 26 is a diagrammatic view showing the various positions of the flipper or means for depositing the material being dried.

In detail the drier of this invention comprises a generally horizontally extending tunnel-like housing 1 (Fig. 1) that is slightly inclined upwardly from a feed hopper 2 at its feed end to its discharge end 3.

Within this housing 1 is an elongated endless conveyor 4 that extends around a drum or pulley 5 at the feed end and around a pulley 6 at the discharge end.

This conveyor 4 is of perforated material, such as woven wire cloth, or screen or perforated metal, and take up pulleys 60 may be provided below its upper run for taking up any slack.

The material to be dried is fed into feed hopper 2 by any suitable means (not shown) and is deposited on the upper rim of conveyor 4. A conventional vertically adjustable feed gate 7 adjacent said feed hopper functions to regulate the depth of the material 8 that is carried upwardly on the conveyor. This gate may be raised or lowered by means of the usual wheel 9 (Fig. 4).

A motor 10 below the discharge end of the drier (Fig. 10) is connected by a belt 11 with a pulley 12 on a shaft 13 that in turn drives a vertical shaft 14 through gears in a gear box 15, said shaft 14 having a gear 61 at its upper end the teeth of which are in mesh with the teeth of a gear 16 that is on the shaft 17 to which the upper pulley 6 of the conveyor is secured.

Shaft 14 also carries a gear 18 the teeth of which are in mesh with a gear 19 on a horizontal shaft 20 that is journalled at its ends in bearings supported on side frame members 21 of the housing and drier. This shaft 20 extends across the drier and the opposite end from gear 19 carries a cam 22 (Fig. 12).

Gear 19 and cam 22 respectively are provided with coaxial crank pins 23, 24 that are equally spaced from the shaft 20, and one end of a pair of the corresponding connecting rods 25 is connected to each of the crank pins 23, 24, said rods extending toward the feed end of the drier and above side frame members 21. At their opposite ends they are secured to bearings 26 (Figs. 14, 15), that are rotatably secured on a horizontal shaft 27 that extends transversely across and above the conveyor.

A second pair of connecting rods 28 extend from bearings 29 on shaft 27 toward the feed end of the machine (Fig. 1) to connect with bearings on another shaft 30, said shaft and bearings being identical with shaft 27 and bearings 26, and a third and fourth pair of connecting rods 31, 32 respectively extend from bearings on shaft 30 to bearings on shafts 33, 34 respectively, the structure being identical with that described for the connection of rods 25, 28 with shaft 27 in each instance. Thus the shafts 27, 30, 33, 34 are connected in a row by corresponding pins of connecting rods 28, 31, 32 and the first pair of connecting rods connects shaft 27 with the crank pins 23, 24 on gear 23 and cam 22.

The shafts 27, 30, 33, 34 have bearings 36 on each adjacent their ends and these bearings 36 are in turn slidably carried on rods 37 (Figs. 10, 14) that extend longitudinally of housing 1 and that are supported on the side frame members 21 thereof.

From the foregoing it will be seen that upon rotation of the shaft 20 the shafts 27, 30, 33, and 34 will be caused to reciprocate transversely of their lengths in a direction longitudinally of the conveyor thereblow.

To prevent any opening in the housing walls during said reciprocation, sliding closure plates 40 (Figs. 21, 22) are provided, and through which each of said shafts extend, these being separate slides for the opposite ends of each shaft. These plates 40 are held against the lateral sides of the housing by retainer guide members 41, and slide along said sides during reciprocation of shaft 30. Above each slide 40 may be a relatively large sliding door 42 held by guides 43 against the housing walls. Access to within the housing adjacent each shaft 27, 30, 33 and 34 is thus provided for, and also the reciprocation of said shafts through the lateral side walls of the housing is accomplished without opening the interior of the housing to the atmosphere for a reason later to be described.

Secured on each shaft 27, 30, 33, 34 is a shovel like receiver or flipper 45 (Fig. 16). Inasmuch as each of these is identical, only one will be described in detail.

Each receiver 45 has a bottom 46 that carries a blade 47 along its free edge, and which blade and edge are in sliding engagement with the upper surface of conveyor 4 and face toward the feed end of the latter. Also said receivers have opposite lateral end walls at the ends of said bottom. The bottom 46 is about parallel with said conveyor but extends slightly upwardly in direction away from blade 47 for a distance and then extends fairly sharply upwardly and over the shaft 30 (or whichever shaft carries the receiver), as seen at 48. The rear edge of said steeply inclined portion 48 is spaced rearwardly (or toward the discharge end of the conveyor) relative to the shaft 30. This inclined portion 48 is rigidly secured to shaft 30 (or 27, 33, 34). Thus it will be seen that any rotation of shafts 27, 30, 33, 34 will cause each receiver 45 thereon to revolve around the shaft.

The blade 47 may be relatively resilient so as to yieldably engage the conveyor 4 upon the shaft that carries the receiver being forceably rotated clockwise as seen in Fig. 16.

Secured on one of the corresponding ends of each shaft 27, 30, 33, 34 is the lower end of an upwardly extending lever arm 50, while alongside each arm 50 is a second vertically extending lever arm 51 that is rotatably mounted at its lower end on one of each of said shafts (Figs. 17, 18, 19). The upper end of each lever 50 has a laterally projecting pin 52 that extends through a fairly short slot 53 in lever 51. The slot 53 permits the lever 51 to rock a short distance in opposite directions before it will be positively connecting with the lever 50.

A lateral projection 54 on each lever 51 has one end of a spring 55 secured thereto, and the opposite end of each spring 55 connects with the pin 52 on lever 50 thereby yieldably holding the pin 52 in one end of slot 53.

The spring 55 in each instance is at the side of lever 50 that is toward the feed end of the drier. Thus if lever 51 (Fig. 19) is moved toward the feed end of the machine, the receiver 45 secured on the shaft that carries the receiver will be revolved clockwise (Fig. 16).

It may occur that some material on the conveyor might be under the bottom 46 or blade 47 when said lever 51 is moved clockwise as seen in Fig. 16, and if so, then the spring 55 will permit the lever 51 to move a sufficient distance to insure a firm contact between blade 47 and the conveyor when the said material is moved from below the receiver without injury to the receiver. As soon as the material is released the blade or forward edge of the receiver will immediately move into contact with the conveyor under the force of spring 55, and said spring may also be used to maintain a yieldable contact between the receiver and the conveyor.

The cam 22 is of the type having a laterally opening channel 56 (Figs. 12, 13) in which a cam follower 57 is positioned, which follower is carried on a lever 58. Lever 58 extends generally upwardly, being pivoted at its lower end to one of the side frame members 21. The follower 57 is about midway between the ends of said lever 58, and a connecting rod 59 is pivotally connected at one of its ends to the upper end of said lever. The opposite end of connecting rod 59 pivotally connects with the upper end of the lever 51 that is secured on shaft 27, and identical connecting rods 59 are pivotally connected at drier ends to each adjacent pair of levers 51 that are secured to shafts 27, 30, 33, 34 as best seen in Figs. 17 to 20. In this manner the movement of the lever 58 as controlled by cam 22 will be transmitted to each of the shafts 27, 30, 33, 34.

From the description so far, it has been explained that the rocking of lever 51 will cause a revolution of the receiver 45 about the horizontal axis of the shaft to which it is secured. Thus a rocking movement of lever 58 (Fig. 12) which is controlled by the cam 22, will cause the said receivers to revolve.

Referring to Fig. 12, it will be seen that when the crank pin 24 is in the position shown therein, the receiver will be half way between the ends of its reciprocating stroke, and upon continued movement of the pin in the direction of the arrow, the lever 58 will be very rapidly swung in a direction for rocking the receiver 45 (Fig. 16) in a clockwise direction as seen in Fig. 16. The receiver 45 is not in the position shown in Fig. 16 when the crank pin 24 and lever 58 are in the position shown in Fig. 12 but instead, the receiver would be in about the dotted line position 65 as seen in Fig. 26, and thus the movement of follower 57 (Fig. 12) to the point 66 on cam 22 would result in swinging the receiver 45 back to about the full line position shown in Figs. 16 and 26, but not fully in said position since point 66 is not the highest point on cam 22. Point 66 is spaced about twice as far from the axis of shaft 20 as the point in contact with follower 57 in Fig. 12, which latter point represents the minimum radius of the cam.

During the movement of the follower 57 to point 66 on cam 22, the crank pin 24 will have about retracted the receiver 45 to the full return end of its stroke or to the maximum distance the receiver moves in the direction of movement of the conveyor 4.

When the receiver is at its fully retracted position and cam follower 57 is at the point 66, the receiver will start down the incline of conveyor 4 and contra to movement of the conveyor. During said movement the lip or blade 47 of the receiver along the leading edge of the bottom will be progressively moved toward the conveyor and will be yieldably pressed against said conveyor by reason of the spring 55. Thus practically all of the distance from point 66 to the highest point 67 on cam 22, the receiver 45 will be against the conveyor, and during this time the receiver will be moving contra to the direction of travel of the conveyor and to the material thereon. Thus the receiver will be in loading position during its said movement. Point 67 represents the maximum radius of the cam and is about three times as far from the axis of the shaft 20 as the point of minimum radius.

When the crank pin 24 has reached the point where the receiver has advanced to its maximum distance in moving against the direction of travel of the material on the conveyor, the follower 57 will be at point 67 and the receiver will be ready for its return stroke.

Inasmuch as the conveyor is carrying material in the same direction as the return stroke of the receiver, it is desirable that the retraction of the receiver be at substantially the same speed of travel as the material 8. The reason for this is that cam 22 is formed to cause the blade or lip 47 to lift through the bed of material 8 during said retraction of the receiver, and it is desirable that there should be no piling up of the material along the leading edge 70 (Fig. 26) thereof, but the bed should be squarely cut off at right angles thereto along its said edge. To effect this result, the cam 22 is shaped so that the lever 58 will swing in a manner to cause the lip 47 to move to the successive positions 71, 72, 73 (Fig. 26) as it retracts, which positions will insure a squarely cut off leading edge 70 for the material.

Once the receiver blade 47 has substantially reached the position 73 the lever 58 will be quite rapidly swung in a direction to give the receiver a quick rearward flip at about point 75 of cam follower 57 on cam 22, thus throwing the material 8 on the conveyor at the side of the receiver toward the discharge end. The action is such that there is no sticking of material in the receiver and the particles of material, such as pieces of fruit, etc. are completely repositioned on the conveyor and are broken apart if they have become stuck together.

The cam follower then functions to return the receiver to the conveyor for the next cycle.

As the rate of reciprocation of the receiver is substantially faster than the speed of travel of the conveyor all of the material on the conveyor will be picked up by each of the receivers, there being no gaps where material is left.

Spring 80 supported between lever 58 and a rigid support 81 secured on frame member 21 functions as a shock absorber for the lever (Fig. 12), and a tension spring 82 connecting each lever 51 with the connecting rod 25, 28, 31 or 32 as the case may be for yieldably holding the cam follower 57 against the cam. In Fig. 16 the spring 82 is connected with the rod 25 which extends between shafts 20, 27. In this manner the tension of the cam follower on the cam is maintained during reciprocation of the receivers.

Below the conveyor 4 are several flue sections generally designated 83, 84, 85 (Figs. 1, 7, 8, 9). The flue section is below the conveyor at the discharge end and has an intake or receiving end across which extends a heating unit 86 in the form of steam pipes 87 (Figs. 5, 6), although electrical heating elements or other suitable heating means may be employed.

Connected with said intake opening is a motor driven blower 88 that blows air across the steam pipes for heating the same and into the main flue 83.

This flue 83 is interiorly divided by partitions into a plurality of separate passageways 89, 90, 91, 92 (Fig. 7) passageways 90, 91 and 92 direct the air generally upwardly through the conveyor 4 and the material thereon.

Gates or dampers 93, 94, 95 are respectively positioned in passageways 90, 91 and 92 for shutting off all or any of these passageways or for regulating the volume of air passing therethrough. As will be seen in Fig. 7 the passageway 92 opens at its discharge end generally in the direction of movement of the upper rim of the conveyor 4, although the contra movement of the lower rim of the conveyor will tend to deflect the air to some extent for passage of the air transversely through the conveyor including the material on the upper rim. Also a deflecting baffle 96 is in said passageway at the return bend therein.

The passageway 91 is secured from the discharge end and passageway 90 is the next one. Passageway 91 has a larger discharge opening than passageway 92 inasmuch as there is less deflection of the air therein, and passageway 90 has the greatest discharge opening which extends along a length of the central portion of the conveyor.

At the juncture between flue 83 and the middle flue 84 is a second heating unit 98 that is identical with the unit 88 except that is it smaller. A recess 99 in the flue (Fig. 8) is adapted to receive said unit. This flue 84 receives its air from the lower passageway 89 of flue 83 and it in turn is divided by partitions into passageways 100, 101, and 102. The former is uppermost and its discharge opening adjoins that of passageway 90 of the flue 83. Passageways 101 and 102 are successively below passageway 100 and they have dampers 103, 104 therein for controlling the volume of air flowing therethrough. These dampers, like the dampers in flue 83, are adjustable separately from fully closed to fully open positions. The discharge end of passageway 101 opens upwardly next to the discharge opening of passageway 100 for directing the heated air upwardly through the conveyor and through the material on the latter.

Between the flues 84 and 85 is another heating unit 105 that is identical with the unit 98 except that it is smaller. The flue 85 is formed at its end that is adjacent flue 84 with a recess 106 for receiving the heater 105 (Fig. 9).

This flue 85 has a single partition 107 therein dividing the flue into two passageways 108, 109. These flues receive heated air from passageway 102 of flue 84 after such air has passed through heater 105, and the passageway 108 adjoins 101 while passageway 109 opens upwardly for discharge of air upwardly through the conveyor at the feed end of the latter.

In one of the lateral side walls of each of the flues are inspection and clean out points 110 each of which is closed by a door 111 (Figs. 7 to 9, 23, 24) and a friction latch 112 releasably holds each of the doors closed. These openings enable the cleaning of the flues in the event any material from the conveyor should fall into them.

The temperature of the heating element 105 is such that relatively hot air is discharged through the material on the conveyor adjacent the feed end. Most materials can usually stand a great deal more heat without injury when they are relatively wet than is possible after some of the moisture is removed.

The temperature of element 98 is not as hot as that of element 105 inasmuch as the material has lost some of its moisture by the time it passes over the discharge openings of flue 83, and the temperature of element 86 is usually least of all inasmuch as the material is practically dry by the time it reaches the discharge openings of flue 82. Exactly what temperatures are employed and their variations is purely a question of the type of material being dried and the desired results.

By the use of the various dampers almost any desired result can be obtained.

The heated moist air passes out of housing 1 through the stack 115 which also may have an adjustable damper 116 therein for controlling the flow of air therethrough (Fig. 25).

As will be seen in Fig. 1 there is preferably at least one receiver or flipper 45 over each of the flues, although the number may vary as desired. In some driers only one receiver may be needed and only one flue or hot air passageway. In others there may be more than are shown.

It is to be understood that modifications can be made in the apparatus shown without departing from the invention inasmuch as the detached description and drawings are merely illustrative of a preferred form of the invention.

I claim:

1. A drier comprising conveyor means for supporting a bed of material thereon for movement along a path of travel in one direction, means for moving said conveyor means in said direction, means for moving heated air into contact with the material on said conveyor means during said movement for drying said material, a material receiver extending across said path and against said conveyor means in a loading position at a point along said path over which said material is adapted to be moved for receiving thereon a load of the material from said conveyor means during said movement of said conveyor, a pivoted support for said receiver adapted to be reciprocated longitudinally of said path for swinging said load upwardly and generally in the direction of said conveyor means and for scattering said material on said conveyor at a point adjacent said receiver but on the side thereof in said direction of travel of said conveyor means and for returning said receiver to said loading position, rotating means spaced from said support and operatively connected thereto for so reciprocating said support.

2. A drier comprising an endless generally horizontally extending conveyor adapted to support material on the upper run thereof for movement in one direction upon actuation of said conveyor, means for subjecting such material to a drying heat during said movement, a receiver for material pivotally supported over said run and extending across the upper side thereof and in engagement therewith, means for reciprocating said receiver longitudinally of said run and for oscillating said receiver about an axis extending over said run parallel therewith and transversely thereof during said movement of said run, one stroke of said oscillatory movement being in a path extending upwardly and generally in the direction of travel of said run during reciprocating movement of said receiver in said direction and the opposite stroke of said oscillatory movement being the reverse of said one stroke and during the reciprocating movement of said receiver in a direction contra to the direction of travel of said run whereby said receiver will be loaded with said material during its movement contra to said direction and will unload its load during its movement with said run thereby repositioning the material on said run, said means for reciprocating and oscillating said receiver comprising a rotatable member horizontally spaced from said receiver and operatively connected thereto.

3. A drier comprising an endless, generally horizontally extending perforate conveyor adapted to support material to be dried on the upper run thereof for movement in one direction upon actuating said conveyor, means for so actuating said conveyor, receiver means positioned over said conveyor for reciprocatory movement parallel with said direction and in engagement with said material during said latter movement in a direction contra to said direction of travel of said upper run only for repositioning said material on said conveyor, a rotating element horizontally spaced from said receiving means and operatively connected thereto for so reciprocating the latter, a flue for heated air having a discharge end opening upwardly below said conveyor for discharge of heated air upwardly through the conveyor and the material thereon, said discharge opening being adjacent the trailing end of said upper run, a feed hopper over said trailing end for feeding material onto said end and a second flue having a discharge opening below said conveyor adjacent the leading end thereof for discharge of heated air through the conveyor and material at said leading end, means for heating the air in said first mentioned flue to a higher degree in said second flue, and said receiver means for repositioning said material being at a plurality of spaced points along the length of said conveyor.

4. In a drier that includes an endless, perforate, generally horizontally extending conveyor having an upper run on which the material to be dried is supported, means for actuating said conveyor for movement of the upper run thereof in one direction, a shovel-like receiver over said run positioned in a loading position with its receiving edge against said conveyor and directed contra to the movement of said run whereby material carried by said run will be loaded onto said receiver over said receiving edge during movement of said run in said direction, means supporting said receiver for rotation about a horizontal axis extending across said upper run transversely of said direction of movement to unloading position for dumping the material on said receivers at the sides thereof that are beyond said respective receivers in said direction of movement, crank means for so rotating said receivers and for returning said receivers from said unloading position to said loading position, said receiver being provided with a material supporting bottom slanting downwardly from said axis and in a direction contra to the direction of said upper run.

5. In a drier that includes an endless, perforate, generally horizontally extending conveyor having an upper run on which the material to be dried is supported, means for actuating said conveyor for movement of the upper run thereof in one direction, a plurality of shovel-like receivers over said run positioned in a loading position with their receiving edges against said conveyor and directed contra to the movement of said run whereby material carried by said run will be loaded onto said receivers over said receiving edges during movement of said run in said direction, means supporting said receivers for swinging about a horizontal axis extending across said upper run transversely of said direction of movement to unloading position for dumping the material on said receivers at the sides thereof that are beyond said respective receivers, means for so rotating said receivers and for returning said receivers from said unloading position to said loading position, means for moving said receivers in a direction contra to said direction of movement when said receivers are in said loading position, and for moving said receivers in said direction of travel during movement of said receivers to said unloading position, said means for so moving said receivers in directions contra to and with the direction of travel of said upper run including a rotary crank, links connecting said receivers for movement as a unit, and the means for swinging said receivers about said respective axes including a pivoted member supporting said receivers for said rotation and with which said links are connected, and cam actuated levers connected with said member.

MOWATT M. HURST.

REFERENCES CITED

The following references are of record in the file of this patent:

UNITED STATES PATENTS

| Number | Name | Date |
|---|---|---|
| 473,263 | Proctor | Apr. 19, 1892 |
| 675,070 | Sargent | May 28, 1901 |
| 748,875 | Mueller | Jan. 5, 1904 |
| 847,038 | Ayres | Mar. 12, 1907 |
| 992,295 | Tiemann | May 16, 1911 |
| 1,213,962 | Siler | Jan. 30, 1917 |
| 1,281,667 | Sargent | Oct. 15, 1918 |
| 1,547,294 | Braemer | July 28, 1925 |
| 1,770,409 | Kehoe | July 15, 1930 |
| 1,864,178 | Belanger | June 21, 1932 |
| 2,308,508 | Harrington | Jan. 19, 1943 |